US009877168B2

(12) United States Patent
Inomata et al.

(10) Patent No.: US 9,877,168 B2
(45) Date of Patent: Jan. 23, 2018

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventors: Kohshiro Inomata, Kanagawa (JP); Takumi Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 104 days.

(21) Appl. No.: 14/614,777

(22) Filed: Feb. 5, 2015

(65) Prior Publication Data
US 2016/0044469 A1 Feb. 11, 2016

(30) Foreign Application Priority Data

Aug. 11, 2014 (JP) .................. 2014-163815

(51) Int. Cl.
*H04W 4/08* (2009.01)
*H04W 76/02* (2009.01)
*H04L 29/08* (2006.01)

(52) U.S. Cl.
CPC .......... *H04W 4/08* (2013.01); *H04W 76/023* (2013.01); *H04L 29/08306* (2013.01); *H04L 67/104* (2013.01)

(58) Field of Classification Search
CPC ...... H04W 4/08; H04W 76/023; H04N 7/152; H04L 65/403
USPC .................. 370/328, 229, 230, 395.2, 395.3
See application file for complete search history.

(56) References Cited

U.S. PATENT DOCUMENTS

| 2006/0272031 A1* | 11/2006 | Ache ................. G06F 21/10 726/28 |
| 2012/0027012 A1* | 2/2012 | Kudo ................. H04L 65/4053 370/389 |
| 2012/0297405 A1* | 11/2012 | Zhang ................. H04H 20/08 725/9 |

(Continued)

FOREIGN PATENT DOCUMENTS

| JP | 2000-036875 A | 2/2000 |
| JP | 2006-074359 A | 3/2006 |
| JP | 2010-033229 A | 2/2010 |

*Primary Examiner* — Edan Orgad
*Assistant Examiner* — Saumit Shah
(74) *Attorney, Agent, or Firm* — Oliff PLC

(57) ABSTRACT

A non-transitory computer readable medium stores a program causing a computer to execute a process for transmission and reception of media data including at least one of audio data and video data among multiple terminal apparatuses connected via a network. The process includes receiving a transmission request for the media data from at least one terminal apparatus among the multiple terminal apparatuses; receiving a reception request for the media data from at least one terminal apparatus among the multiple terminal apparatuses; and establishing a communication path to transmit the media data between a terminal apparatus that has made the transmission request among the multiple terminal apparatuses and at least one of terminal apparatuses that have made the reception request among the multiple terminal apparatuses, in a case where the total number of terminal apparatuses that have made the transmission request is less than or equal to a predetermined set value.

13 Claims, 17 Drawing Sheets

(56) References Cited

U.S. PATENT DOCUMENTS

2014/0333713 A1* 11/2014 Shoemake .......... H04L 65/1069
348/14.05

* cited by examiner

FIG. 6

| TERMINAL NAME | IDENTIFICATION INFORMATION |
|---|---|
| 10a | ID001 |
| 10f | ID006 |

FIG. 7

| TERMINAL NAME | IDENTIFICATION INFORMATION |
|---|---|
| 10a | ID001 |
| 10b | ID002 |
| 10c | ID003 |
| 10d | ID004 |
| 10e | ID005 |
| 10f | ID006 |

FIG. 8

| TERMINAL NAME | IDENTIFICATION INFORMATION |
|---|---|
| 10a | ID001 |
| 10b | ID002 |
| 10c | ID003 |
| 10d | ID004 |
| 10e | ID005 |
| 10f | ID006 |
| 10g | ID007 |

FIG. 17

| TERMINAL NAME | IDENTIFICATION INFORMATION |
|---|---|
| 10a | ID001 |
| 10d | ID004 |
| 10e | ID005 |
| 10f | ID006 |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-163815 filed Aug. 11, 2014.

BACKGROUND (i) Technical Field

The present invention relates to an information processing apparatus, an information processing system, and a non-transitory computer readable medium.

(ii) Related Art

Systems for transmission and reception of audio data and video data among multiple terminal apparatuses connected via a network have been proposed in recent years. Such systems are used in, for example, teleconferences in which multiple users at different locations simultaneously participate.

In the existing systems described above, multiple terminal apparatuses connected via a network mutually establish communication paths (or audio communication paths) through which audio data is transmitted and received among all the terminal apparatuses, and audio data of users (or speakers) is transmitted to the individual terminal apparatuses over the communication paths. In the configuration described above, each terminal apparatus establishes a communication path with any of the other terminal apparatuses. Thus, the number of communication paths to be established over the entire system increases with the number of terminal apparatuses. Accordingly, for example, in a large-scale conference with a large number of terminal apparatuses, network bandwidth is tight, and interruption or delay of audio occurs, causing a reduction in audio communication quality.

SUMMARY

According to an aspect of the invention, there is provided a non-transitory computer readable medium storing a program causing a computer to execute a process for transmission and reception of media data including at least one of audio data and video data among multiple terminal apparatuses connected via a network. The process includes receiving a transmission request for the media data from at least one terminal apparatus among the multiple terminal apparatuses; receiving a reception request for the media data from at least one terminal apparatus among the multiple terminal apparatuses; and establishing a communication path to transmit the media data between a terminal apparatus that has made the transmission request among the multiple terminal apparatuses and at least one of terminal apparatuses that have made the reception request among the multiple terminal apparatuses, in a case where the total number of terminal apparatuses that have made the transmission request is less than or equal to a predetermined set value.

BRIEF DESCRIPTION OF THE DRAWINGS

An exemplary embodiment of the present invention will be described in detail based on the following figures, wherein:

FIG. 6 illustrates an example of a transmission terminal list;

FIG. 7 illustrates an example of a reception terminal list;

FIG. 8 illustrates an example of an updated reception terminal list;

FIG. 17 illustrates an example of a reception terminal list;

DETAILED DESCRIPTION

An exemplary embodiment of the present invention will be described hereinafter with reference to the drawings. In this exemplary embodiment, a teleconferencing system for transmission and reception of audio data among multiple terminal apparatuses connected via a network will be described as an example of an information processing system.

Figure 1:
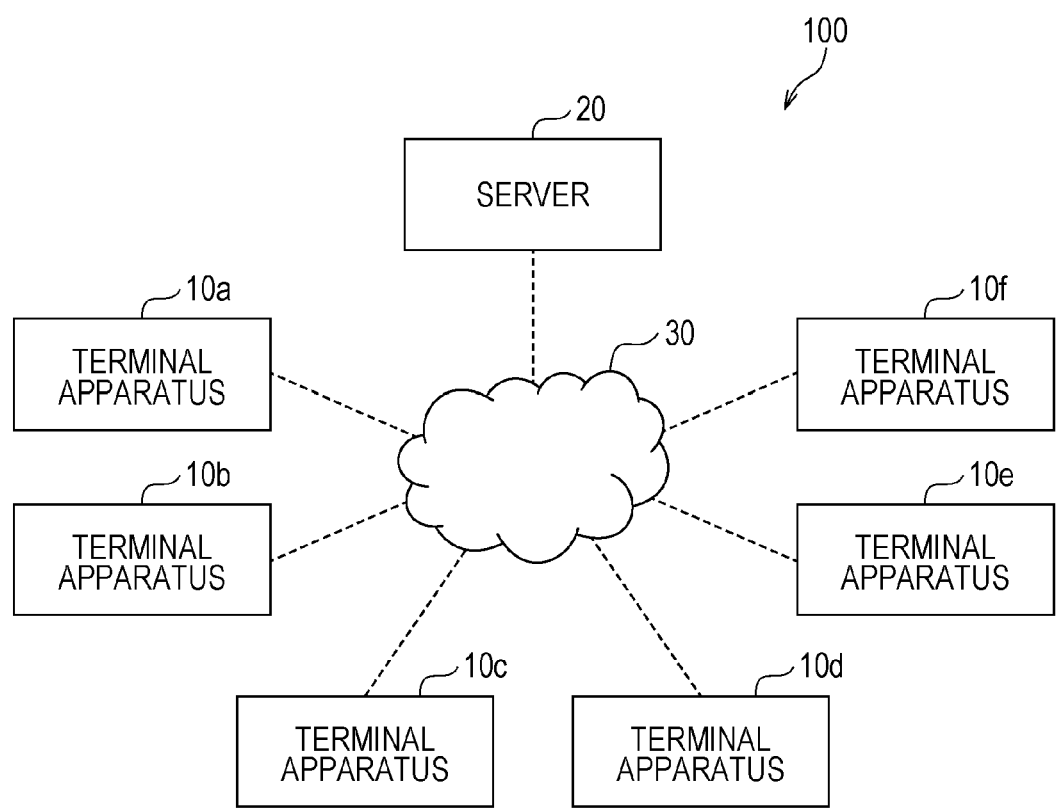
FIG. 1 is an overall configuration diagram of a teleconferencing system according to an exemplary embodiment.

FIG. 1 is an overall configuration diagram of a teleconferencing system according to this exemplary embodiment. A teleconferencing system (or an information processing system) 100 includes multiple terminal apparatuses 10 that multiple users participating in a conference respectively use, and a server 20 that communicates information to the terminal apparatuses 10. In FIG. 1, six terminal apparatuses 10a to 10f, and a single server 20 connected to the terminal apparatuses 10a to 10f via a communication network 30 are illustrated. The number of terminal apparatuses 10 included in the teleconferencing system 100 is not limited to any specific number. In the following, the individual terminal apparatuses will be collectively referred to as the "terminal apparatus 10" to discuss a common configuration.

As illustrated in FIG. 1, the terminal apparatuses 10 and the server 20 are connected to each other via the communication network 30 such as a local area network (LAN) or the Internet. In FIG. 1 and other diagrams described below, dotted lines indicate network connections. Control information and the like to be provided to terminal apparatuses are transmitted and received among the terminal apparatuses via the communication network 30.

Figure 2:
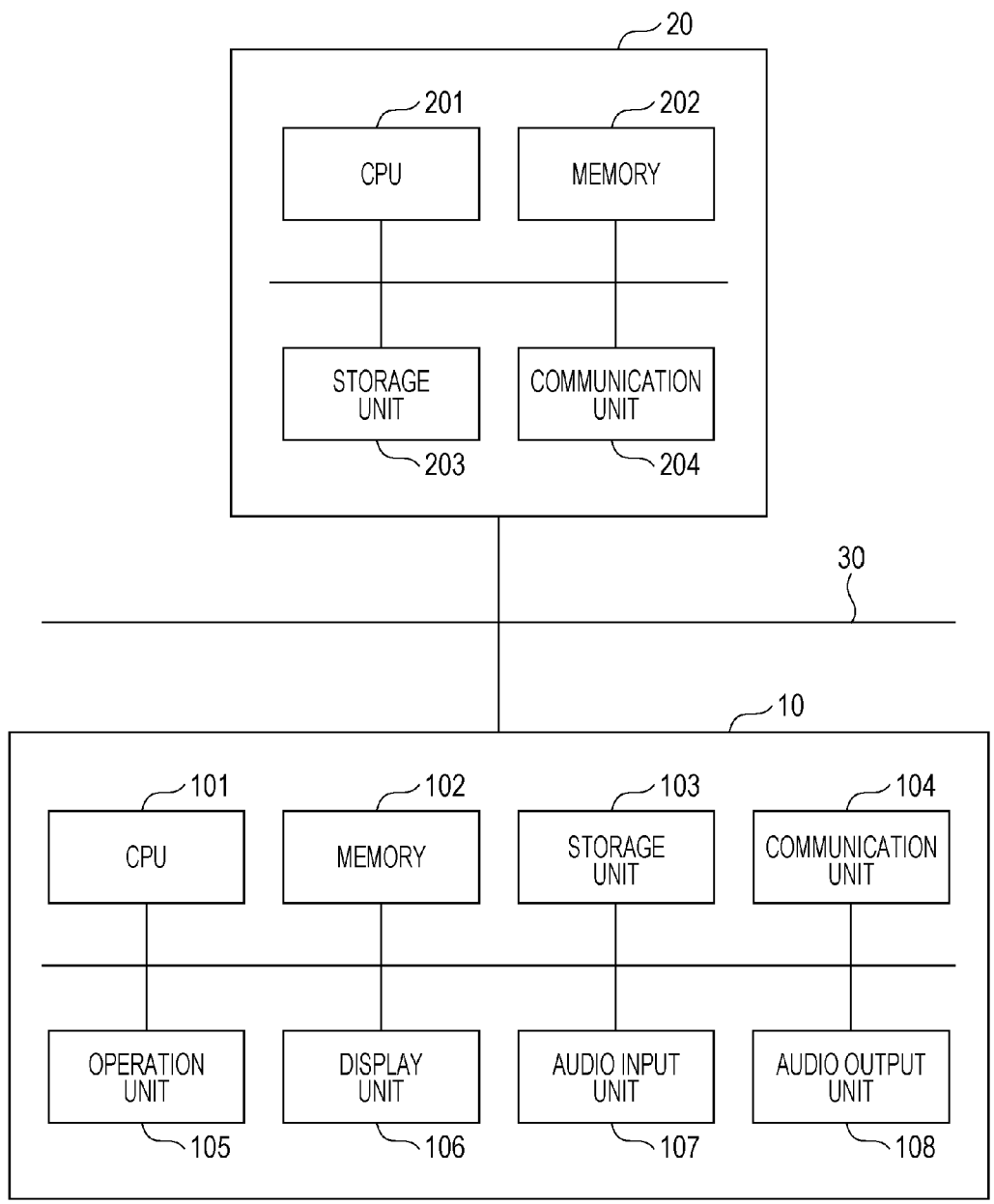
FIG. 2 is a block diagram illustrating a hardware configuration of a terminal apparatus and a server.

FIG. 2 is a block diagram illustrating a hardware configuration of the terminal apparatus 10 and the server 20. The terminal apparatus 10 is composed of a computer including a central processing unit (CPU) 101, a memory 102, a storage unit 103, a communication unit 104, an operation unit 105, a display unit 106, an audio input unit 107, and an audio output unit 108. The hardware elements described above are connected to one another via a bus so as to allow mutual transmission and reception of data. The CPU 101 controls each unit of the terminal apparatus 10, and executes various kinds of information processing. The memory 102 holds various programs and data. The memory 102 also has a working area for the CPU 101. The storage unit 103 stores data of various files, documents, and the like. The communication unit 104 performs data communication with the server 20 and the other terminal apparatuses 10 via the communication network 30. The operation unit 105 is an input device such as a keyboard, a mouse, the Pen tool, or a touch panel. The display unit 106 is a display screen on which various files, documents, and the like are displayed by using application software such as a web browser. The display unit 106 also displays an operation screen for accepting an operation of a user during a teleconference. The audio input unit 107 is a microphone that receives, as input, the speech uttered by a user during the teleconference. The audio output unit 108 is a speaker that outputs, as audio, audio data received from another terminal apparatus 10 during the teleconference. The storage unit 103, the operation unit 105, the display unit 106, the audio input unit 107, and the audio output unit 108 may be provided outside the terminal apparatus 10, and may be connected to the terminal apparatus 10 via the communication network 30. Further, the terminal apparatus 10 has incorporated therein software such as a browser or an electronic mail client. Examples of the terminal apparatus 10 include mobile information terminals such as a personal computer, a personal digital assistant (PDA), and a smartphone.

The server 20 is composed of a computer including a CPU 201, a memory 202, a storage unit 203, and a communication unit 204. The hardware elements described above are connected to one another via a bus so as to allow mutual transmission and reception of data. The CPU 201 controls each unit of the server 20, and executes various kinds of information processing. The memory 202 holds various programs and data. The memory 202 also has a working area for the CPU 201. The storage unit 203 stores data of various files, documents, and the like. The communication unit 204 performs data communication with the terminal apparatuses 10 via the communication network 30.

Each of the terminal apparatuses 10 may have both a transmission function of transmitting audio data of speech made by a user, and a reception function of receiving the audio data, or may have either of them. The function of each of the terminal apparatuses 10 may be determined in accordance with the instructions given by a user who uses the terminal apparatus 10, the teleconference type, or the like.

Figure 3:
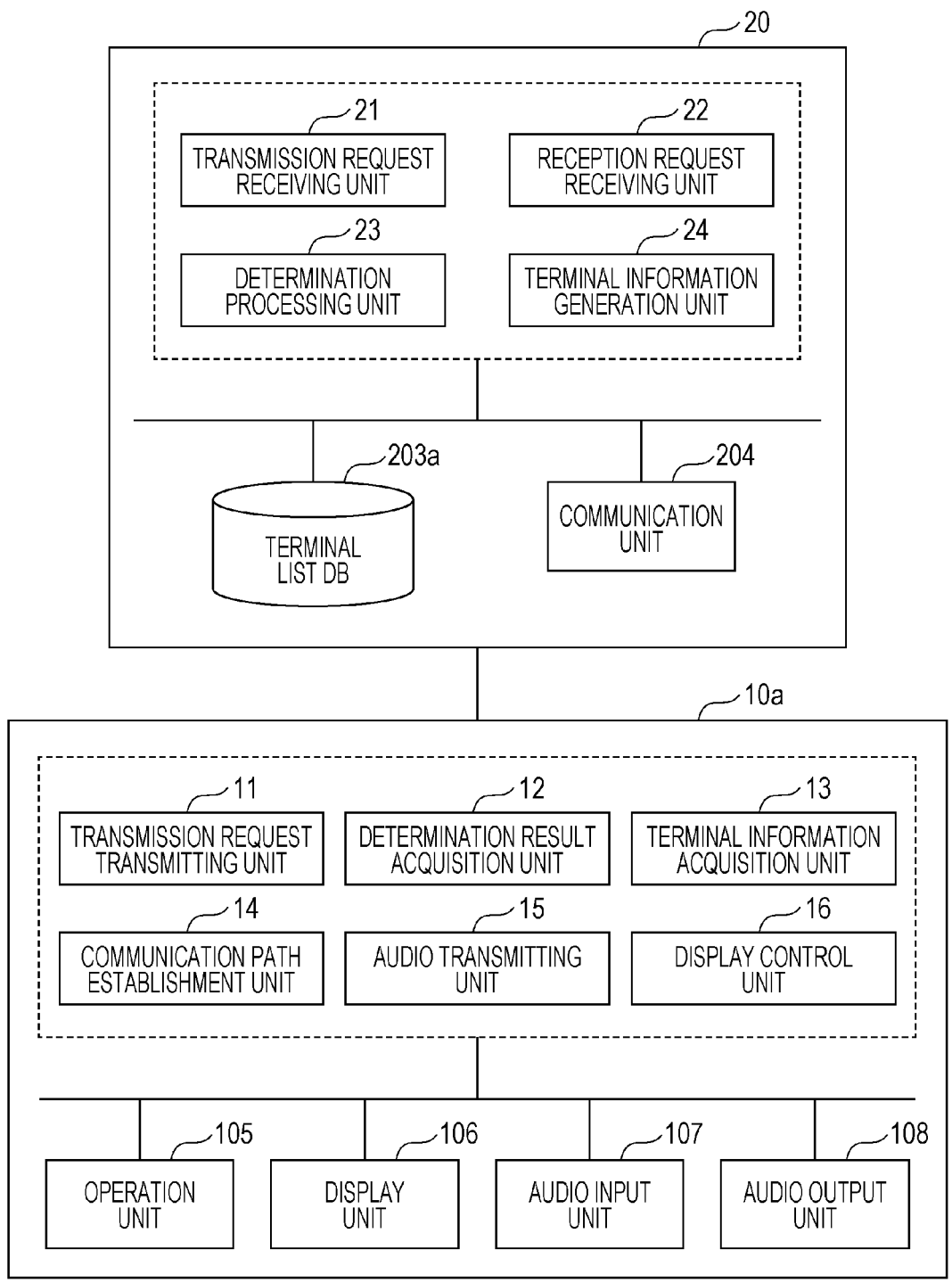
FIG. 3 is a functional block diagram illustrating a specific configuration of the teleconferencing system.
Figure 4:
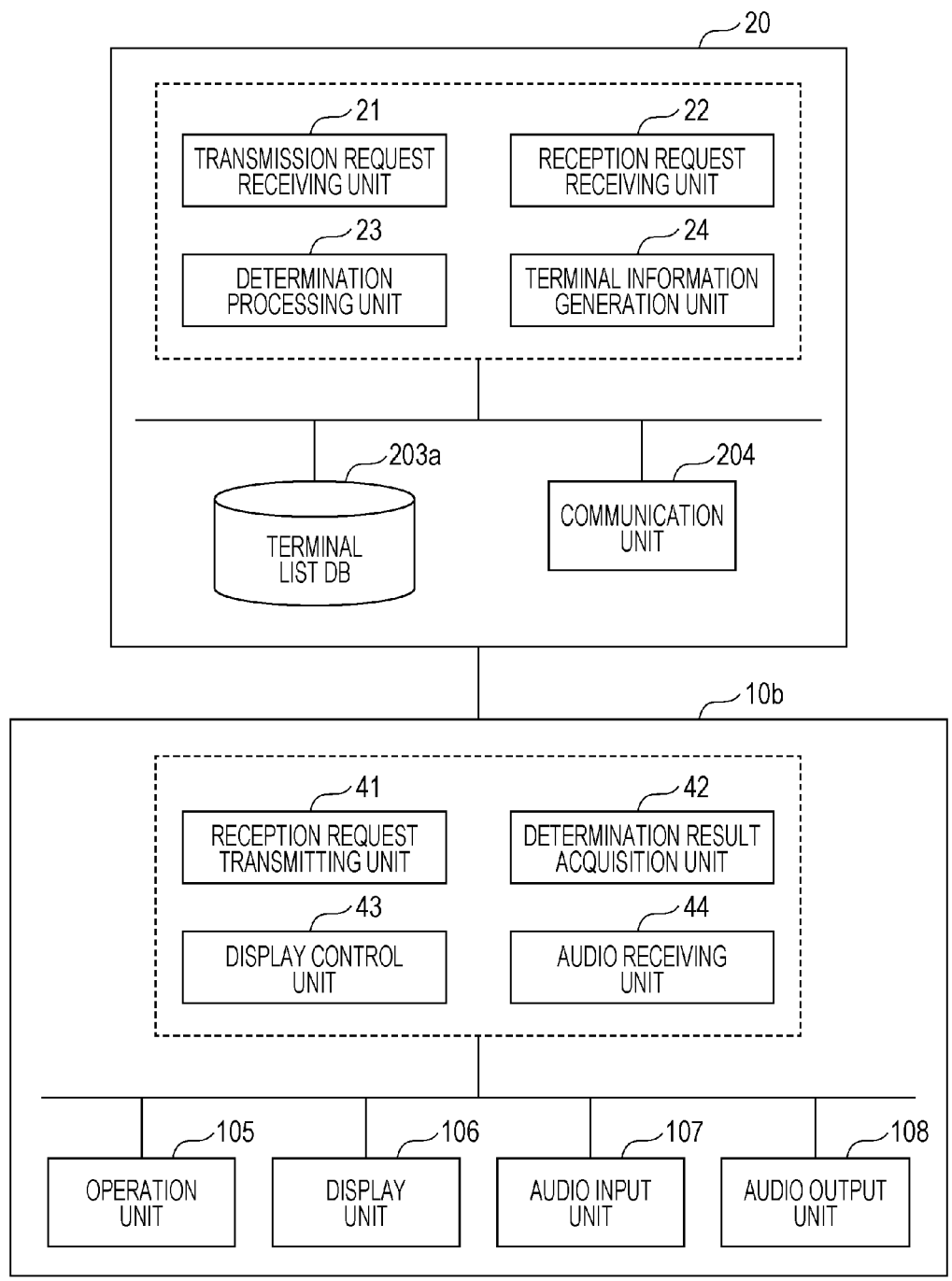
FIG. 4 is a functional block diagram illustrating a specific configuration of the teleconferencing system.

FIG. 3 and FIG. 4 are functional block diagrams illustrating a specific configuration of the teleconferencing system 100. For convenience of illustration, function blocks corresponding to the transmission function are illustrated in the terminal apparatus 10a illustrated in FIG. 3, and function blocks corresponding to the reception function are illustrated in the terminal apparatus 10b illustrated in FIG. 4. As described above, the terminal apparatus 10a may also have the reception function (see FIG. 4), and the terminal apparatus 10b may also have the transmission function (see FIG. 3). In the following, references will also be made to the case where each terminal apparatus has both of the functions, if necessary.

As illustrated in FIG. 3 and FIG. 4, the server 20 includes a transmission request receiving unit 21, a reception request receiving unit 22, a determination processing unit 23, and a terminal information generation unit 24. As illustrated in FIG. 3, the terminal apparatus 10a includes a transmission request transmitting unit 11, a determination result acquisition unit 12, a terminal information acquisition unit 13, a communication path establishment unit 14, an audio transmitting unit 15, and a display control unit 16. As illustrated in FIG. 4, the terminal apparatus 10b includes a reception request transmitting unit 41, a determination result acquisition unit 42, a display control unit 43, and an audio receiving unit 44.

The elements included in each of the terminal apparatuses 10 and the elements included in the server 20 are implemented by the CPUs 101 and 201 executing a program stored in the memories 102 and 202 (see FIG. 2), respectively.

The program may be installed from a computer-readable information storage medium such as a compact disc read-only memory (CD-ROM), a digital versatile disc ROM (DVD-ROM), or a memory card into the terminal apparatus 10 and the server 20, or may be downloaded via the communication network 30 such as the Internet. Alternatively, a program corresponding to a given element may be downloaded to each of the terminal apparatuses 10 from the server 20 on which the programs corresponding to the individual elements described above are stored in advance.

Figure 5:
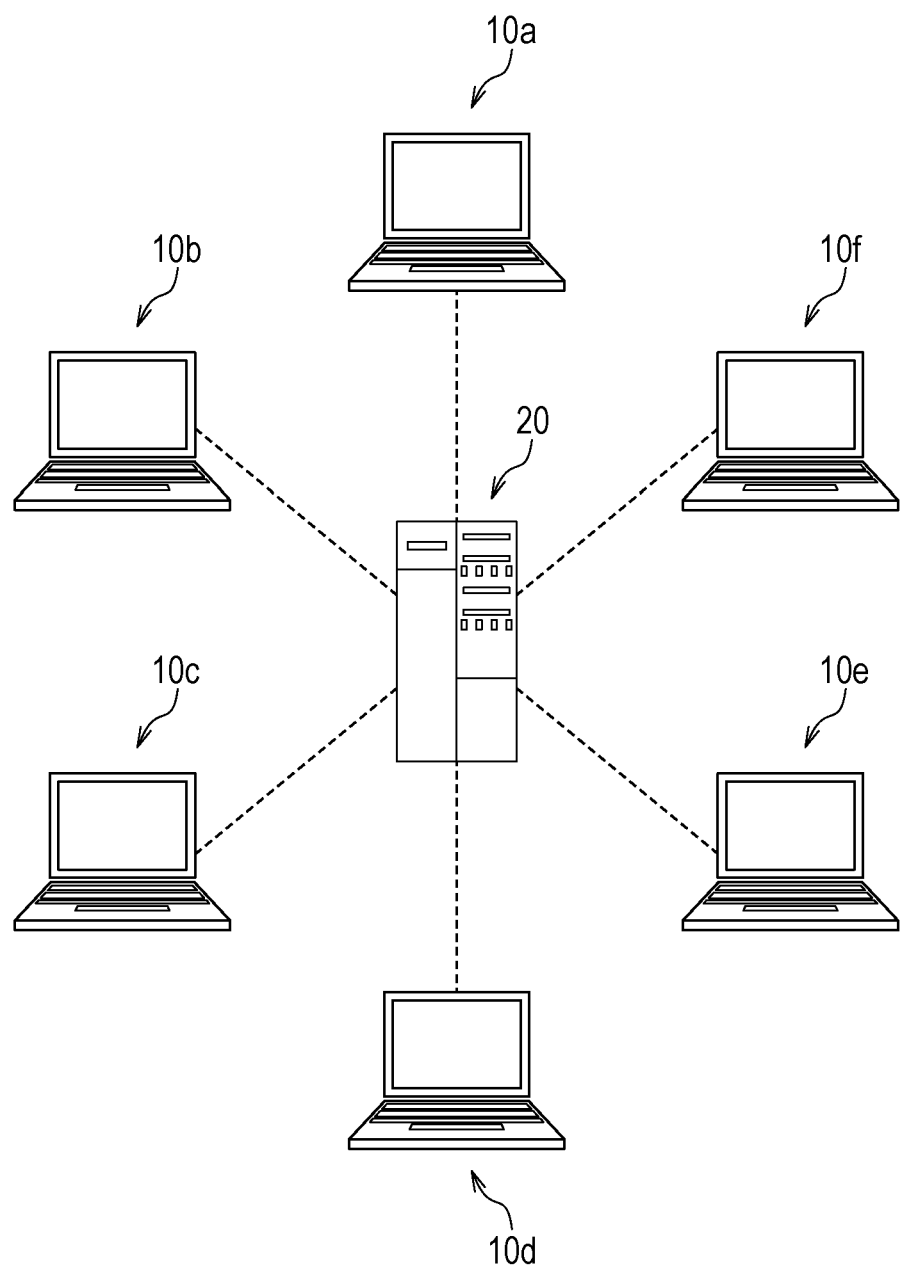
FIG. 5 illustrates an example of a network configuration of the teleconferencing system.

For example, as illustrated in FIG. 5, in a network configuration in which the terminal apparatuses 10a to 10f are connected to the server 20, at the time when each of the terminal apparatuses 10a to 10f is connected to the server 20, a program corresponding to a given element may be downloaded to the memory 102 of the corresponding one of the terminal apparatuses 10a to 10f from the server 20 on which the programs corresponding to the individual elements described above are stored in advance. The program to be downloaded may be created by, for example, JAVASCRIPT (registered trademark). Each of the terminal apparatuses 10a to 10f acquires the program described above when connected to the server 20.

The functions corresponding to the program described above will now be described. In the following, a description will be given with reference to the process flow of the teleconferencing system 100 according to the progress of a teleconference.

First, in a case where a user wishes to transmit their spoken utterance (or speech) to another terminal apparatus 10 during the teleconference, that is, in a case where the user requests the establishment of a communication path between their terminal apparatus and another terminal apparatus to transmit audio data, the user operates the operation unit 105 of the terminal apparatus 10 to give instructions to establish a communication path. For example, a user A selects an "audio transmission" selection screen (for example, a checkbox or an electronic button) displayed on the display unit 106 of the terminal apparatus 10a (see FIG. 3) that the user A uses during the teleconference, by using a keyboard, a mouse, and the like. The transmission request transmitting unit 11 of the terminal apparatus 10a transmits the accepted request of the user A (hereinafter referred to as the "transmission request") to the server 20. For example, when the user A unchecks the "audio transmission" checkbox or when a predetermined condition is satisfied (described below), the transmission request transmitting unit 11 transmits a transmission cancellation request. For example, the transmission request transmitting unit 11 transmits "+1" to transmit a transmission request, and transmits "−1" to transmit a cancellation request.

Further, in a case where a user wishes to receive a spoken utterance (or speech) of another user in a teleconference, the user operates the operation unit 105 of the terminal apparatus 10 to give instructions to receive the utterance (or speech). For example, a user B selects an "audio reception" selection screen (for example, a checkbox or an electronic button) displayed on the display unit 106 of the terminal apparatus 10*b* (see FIG. 4) that the user B uses during the teleconference, by using a keyboard, a mouse, and the like. The reception request transmitting unit 41 of the terminal apparatus 10*b* transmits the accepted request of the user B (hereinafter referred to as the "reception request") to the server 20. For example, when the user B unchecks the "audio reception" checkbox or when a predetermined condition is satisfied (described below), the reception request transmitting unit 41 transmits a reception cancellation request. For example, the reception request transmitting unit 41 transmits "+1" to transmit a reception request, and transmits "−1" to transmit a cancellation request.

Each of the terminal apparatuses 10 has displayed thereon the both "audio transmission" and "audio reception" selection screens, and the user is able to separately select the selection screens. For example, the user A may be able to select both "audio transmission" and "audio reception" on the terminal apparatus 10*a*.

The transmission request receiving unit 21 of the server 20 receives a transmission request transmitted from the transmission request transmitting unit 11 of the terminal apparatus 10. For example, in a case where a transmission request is transmitted from each of the terminal apparatuses 10*a* and 10*f*, the transmission request receiving unit 21 receives the transmission requests from the terminal apparatuses 10*a* and 10*f*.

The reception request receiving unit 22 of the server 20 receives a reception request transmitted from the reception request transmitting unit 41 of the terminal apparatus 10. For example, in a case where a reception request is transmitted from each of the terminal apparatuses 10*a* to 10*f*, the reception request receiving unit 22 receives the reception requests from the terminal apparatuses 10*a* to 10*f*.

The determination processing unit 23 of the server 20 determines, in accordance with a transmission request received by the transmission request receiving unit 21, whether or not the terminal apparatus 10 that has transmitted the transmission request is permitted to transmit audio. Specifically, the determination processing unit 23 compares the total number of terminal apparatuses that have made a transmission request received by the transmission request receiving unit 21 with a predetermined set value, and determines whether or not the total number is less than or equal to the set value. If the total number is less than or equal to the set value, the determination processing unit 23 permits a terminal apparatus that has made a transmission request to transmit audio. If the total number of terminal apparatuses is greater than the set value, the determination processing unit 23 does not permit a terminal apparatus that has made a transmission request to transmit audio. For example, the set value is set to "3". In this case, if the terminal apparatuses 10*a* and 10*f* have made a transmission request, the total number of terminal apparatuses that have made the transmission request is two, and is less than or equal to the set value, which is three. Thus, the terminal apparatuses 10*a* and 10*f* are permitted to transmit audio.

The determination processing unit 23 calculates the total number of terminal apparatuses 10 that have made a transmission request at the current point in time (or at the time when the target terminal apparatus makes a transmission request). For example, the terminal apparatuses 10*a* and 10*f* have already made a transmission request, and the terminal apparatus 10*b* further makes a transmission request. In this case, the total number of terminal apparatuses that have made the transmission request is currently three. For example, in a case where the set value is set to "2", if the terminal apparatuses 10*a* and 10*f* have already made a transmission request (in which case audio transmission may have already been transmitted) and the terminal apparatus 10*b* further makes a transmission request, the total number is three, and is greater than the set value, which is two. Thus, the terminal apparatus 10*b* that has further made a transmission request is not permitted to transmit audio.

In the manner described above, a number of terminal apparatuses 10 are permitted to transmit audio in the order in which transmission requests have been made until the number of terminal apparatuses 10 has reached a set value. If the number of terminal apparatuses 10 permitted to transmit audio has reached the set value, no further terminal apparatuses 10 will be permitted to transmit audio unless audio transmission (or communication path) by one or more of the terminal apparatuses 10 is canceled.

The determination processing unit 23 transmits the determination result (a permission notification or a non-permission notification) to the terminal apparatus 10 that has transmitted a transmission request.

The determination processing unit 23 may also determine, in accordance with a reception request received by the reception request receiving unit 22, whether the terminal apparatus 10 that has transmitted the reception request is permitted to receive audio. For example, the determination processing unit 23 may compare the total number of terminal apparatuses 10 that have made a reception request received by the reception request receiving unit 22 with a predetermined set value, and determine whether or not the total number is less than or equal to the set value. The determination processing unit 23 may also determine whether or not to permit audio reception in accordance with other conditions described below (a first modification described below). Further, the determination processing unit 23 may permit audio reception for all the reception requests received by the reception request receiving unit 22. The determination processing unit 23 transmits the determination result (a permission notification or a non-permission notification) to the terminal apparatus 10 that has transmitted a reception request.

Further, if the total number of terminal apparatuses 10 allowed to make a transmission request has reached a set value, the determination processing unit 23 may transmit a notification (message) indicating that the number of transmission terminals have reached a specified value (or set value) and that no further transmission terminals are allowed to make a transmission request to all the terminal apparatuses 10 connected to the server 20. Similarly, if the number of terminal apparatuses 10 allowed to make a transmission request in response to a transmission cancellation request has fallen below the set value, the determination processing unit 23 may transmit a notification indicating that a transmission request is possible to make to all the terminal apparatuses 10. The determination processing unit 23 may also transmit a notification indicating the remaining number of terminal apparatuses 10 up to the set value. For example, the set value is set to two. In this case, the following case may be assumed: When a transmission request is made from the terminal apparatus 10a, the terminal apparatus 10a is notified of the transmission permission, and a notification indicating the remaining number of terminal apparatuses 10 up to the set value, which is "1", is transmitted to all the terminal apparatuses 10. Then, when a transmission request is made from the terminal apparatus 10f, the terminal apparatus 10f is notified of the transmission permission, and a notification indicating the remaining number of terminal apparatuses 10, which is "0", is transmitted to all the terminal apparatuses 10. Further, when a transmission cancellation request is made from the terminal apparatus 10a, a notification indicating the remaining number of terminal apparatuses 10, which is "1", is transmitted to all the terminal apparatuses 10. The determination processing unit 23 may execute a process similar to that described above for a reception request.

The terminal information generation unit 24 of the server 20 generates transmission terminal information in accordance with a transmission request received by the transmission request receiving unit 21 and the determination result described above obtained by the determination processing unit 23. Specifically, if the total number is less than or equal to the set value, the terminal information generation unit 24 lists pieces of terminal information on the terminal apparatuses 10 that are permitted to transmit audio to generate a transmission terminal list. For example, if transmission requests received from the terminal apparatuses 10a and 10f are permitted, the terminal information generation unit 24 lists pieces of terminal information including, for example, the names and identification information (such as the terminal ID and the IP address) of the terminal apparatuses 10a and 10f to generate a transmission terminal list. FIG. 6 illustrates an example of the transmission terminal list. The terminal information generation unit 24 updates the transmission terminal list each time a received transmission request is permitted or each time a transmission request is canceled. The generated transmission terminal list is saved in a terminal list DB 203a.

Further, the terminal information generation unit 24 generates reception terminal information in accordance with a reception request received by the reception request receiving unit 22. Specifically, the terminal information generation unit 24 lists pieces of terminal information on the terminal apparatuses 10 for which a reception request is permitted to generate a reception terminal list. For example, if reception requests received from the terminal apparatuses 10a to 10f are permitted, the terminal information generation unit 24 lists pieces of terminal information including, for example, the names and identification information (such as the terminal ID and the IP address) of the terminal apparatuses 10a to 10f to generate a reception terminal list. FIG. 7 illustrates an example of the reception terminal list. The terminal information generation unit 24 updates the reception terminal list each time a received reception request is permitted or each time a reception request is canceled. FIG. 8 illustrates an updated reception terminal list when a new reception request received from a network-connected terminal apparatus 10g (not illustrated) is permitted in the state illustrated in FIG. 7. The generated reception terminal list is saved in the terminal list DB 203a.

Further, the terminal information generation unit 24 transmits the reception terminal list to the terminal apparatuses 10 that are permitted to transmit audio by the determination processing unit 23. Also when the reception terminal list is updated (or modified), the terminal information generation unit 24 transmits the updated reception terminal list to the terminal apparatuses 10 that are permitted to transmit audio. For example, if the terminal apparatuses 10a and 10f are permitted to transmit audio, the terminal information generation unit 24 transmits the reception terminal list (see FIG. 7) to the terminal apparatuses 10a and 10f. Also when the reception terminal list is updated, the terminal information generation unit 24 transmits the updated reception terminal list to the terminal apparatuses 10a and 10f. The terminal information generation unit 24 may transmit only the modified (or added) portion of the reception terminal list to the terminal apparatuses 10a and 10f.

The determination result acquisition unit 12 of the terminal apparatus 10a receives (or acquires) the determination result obtained by the determination processing unit 23 of the server 20. For example, the determination result acquisition units 12 of the terminal apparatuses 10a and 10f acquire an audio transmission permission notification from the server 20.

The terminal information acquisition unit 13 (or terminal information receiving unit) of the terminal apparatus 10a receives (or acquires) the reception terminal list from the terminal information generation unit 24 of the server 20. For example, the terminal information acquisition units 13 of the terminal apparatuses 10a and 10f acquire the reception terminal list illustrated in FIG. 7 from the server 20.

Figure 9:
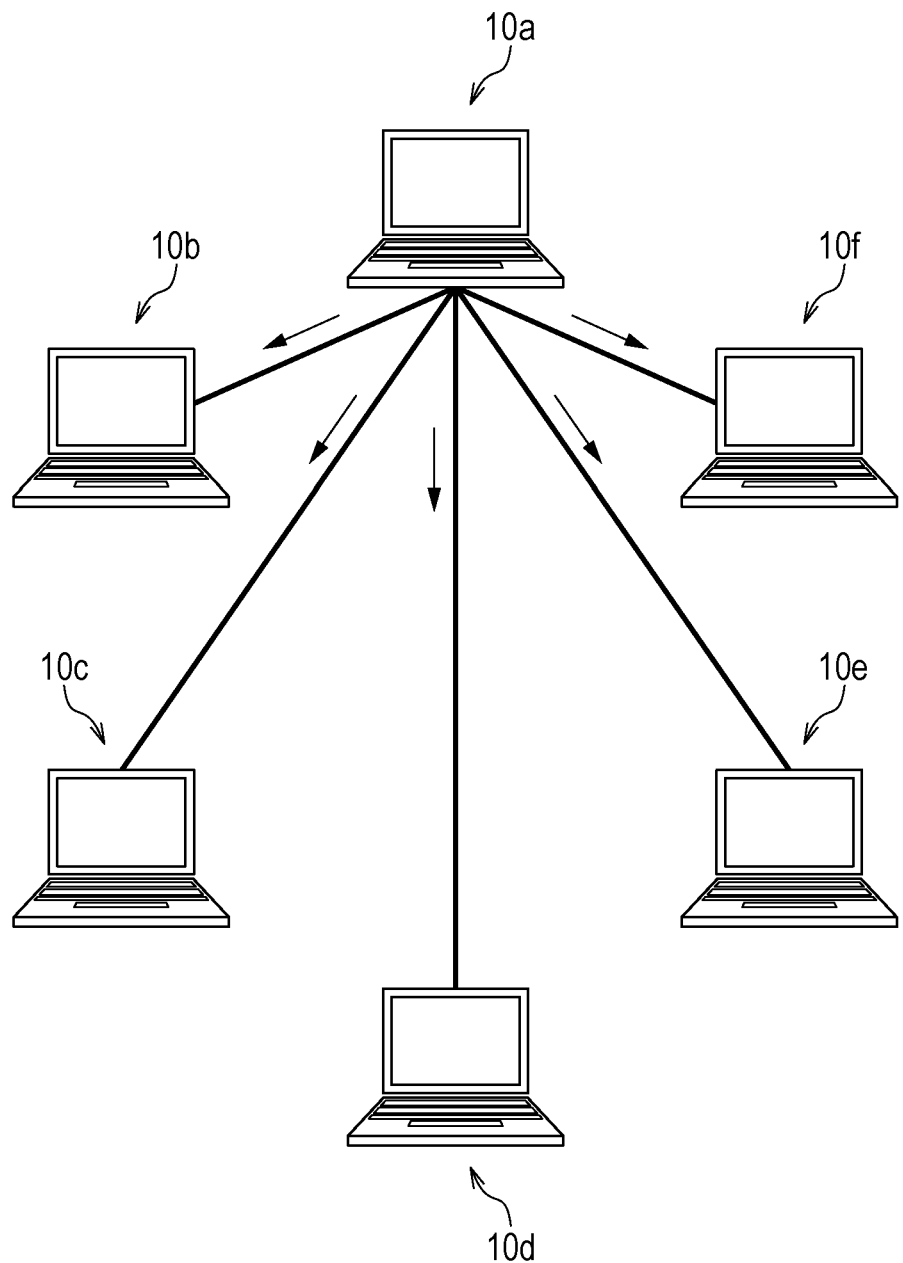
FIG. 9 illustrates an example of a network configuration including communication paths.
Figure 10:
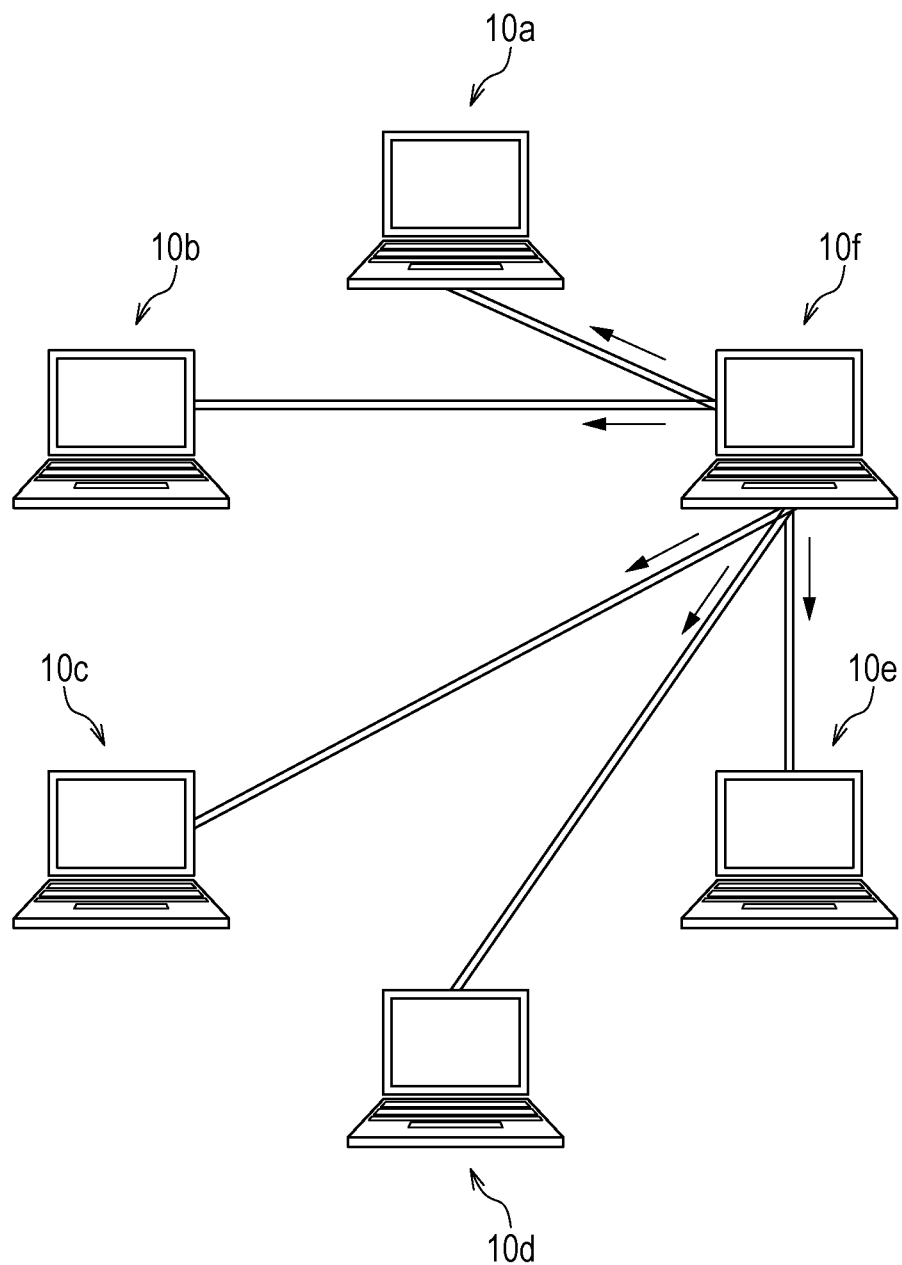
FIG. 10 illustrates an example of a network configuration including communication paths.
Figure 11:
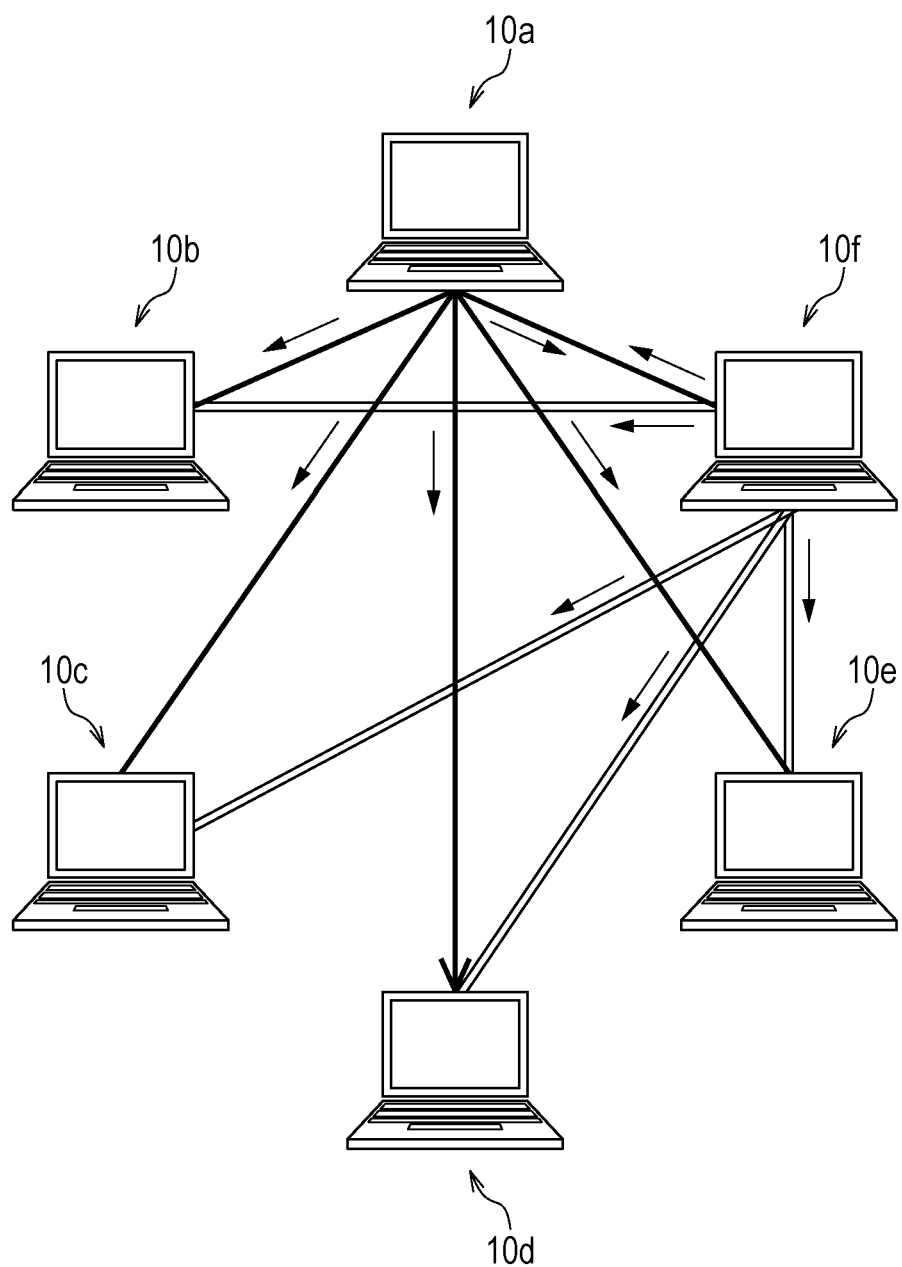
FIG. 11 illustrates an example of a network configuration including communication paths.

The communication path establishment unit 14 of the terminal apparatus 10a establishes a communication path with another terminal apparatus 10 to transmit (or for transmission and reception of) audio data in accordance with the reception terminal list acquired from the terminal information acquisition unit 13. The acquired reception terminal list is saved in the storage unit 103. For example, the communication path establishment unit 14 of the terminal apparatus 10a establishes a communication path between the terminal apparatus 10a and each of the terminal apparatuses 10b, 10c, 10d, 10e, and 10f. FIG. 9 illustrates a network configuration including communication paths established between the terminal apparatus 10a and the terminal apparatuses 10b, 10c, 10d, 10e, and 10f. Similarly, the communication path establishment unit 14 of the terminal apparatus 10f establishes a communication path between the terminal apparatus 10f and each of the terminal apparatuses 10a, 10b, 10c, 10d, and 10e. FIG. 10 illustrates a network configuration including communication paths established between the terminal apparatus 10f and the terminal apparatuses 10a, 10b, 10c, 10d, and 10e. FIG. 11 illustrates a network configuration including all the communication paths established in the example described above. In FIGS. 9 to 11, the orientation of the arrows represents the direction of transmission of audio data. While FIGS. 9 to 11 illustrate a configuration for transmission and reception of audio data without intervention of the server 20, the network configuration is not limited to the configuration illustrated in FIGS. 9 to 11. A configuration for transmission and reception of audio data via the server 20 serving as a relay may be used.

Further, a communication path is established by, for example, a terminal apparatus (or a transmission terminal apparatus) for audio transmission with respect to a terminal apparatus (or a reception terminal apparatus) for audio reception in accordance with reception terminal information, namely, the IP address and the port number. For example, when the user A unchecks the "audio transmission" checkbox displayed on the display unit 106 of the terminal apparatus 10a, the communication path establishment unit 14 cancels the established communication path.

When the communication path is established by the communication path establishment unit 14, the audio transmitting unit 15 of the terminal apparatus 10a transmits (or distributes) audio data input to the audio input unit 107 to the terminal apparatuses 10 via the established communication paths. For example, the audio transmitting unit 15 transmits audio data corresponding to a spoken utterance (or speech) of the user A, which is input to the audio input unit 107 of the terminal apparatus 10a, to the terminal apparatuses 10b, 10c, 10d, 10e, and 10f via the communication paths (indicated by the single lines in FIG. 11). Further, the audio transmitting unit 15 transmits audio data corresponding to a spoken utterance (or speech) of a user F, which is input to the audio input unit 107 of the terminal apparatus 10f, to the terminal apparatuses 10a, 10b, 10c, 10d, and 10e via the communication paths (indicated by the double lines in FIG. 11). Accordingly, for example, the spoken utterance (or audio data) of the user A and the spoken utterance (or audio data) of the user F may be transmitted to the other terminal apparatuses 10 at the same timing. The audio transmitting unit 15 may perform stream transmission (via streaming) to each of the terminal apparatus 10, or may transmit an audio data file to each of the terminal apparatuses 10. If each of a transmission terminal apparatus and a reception terminal apparatus has a web browser incorporated therein, an audio stream in the transmission terminal apparatus may be connected to the reception terminal apparatus by using Web Real-Time Communication (WebRTC).

The display control unit 16 of the terminal apparatus 10a causes display content to be displayed on the display unit 106 in accordance with the determination result acquired by the determination result acquisition unit 12. For example, if the determination result acquisition unit 12 acquires an audio transmission permission notification from the server 20, the display control unit 16 causes a message, which indicates that audio transmission has been permitted, to be displayed on the display unit 106. If the determination result acquisition unit 12 acquires an audio transmission non-permission notification from the server 20, the display control unit 16 causes an error message, which indicates that audio transmission has not been permitted, to be displayed on the display unit 106, and modifies the "audio transmission" selection screen (checkbox or electronic button) displayed on the display unit 106 so that the selection screen will not be selectable. For example, an electronic button for selecting audio transmission (transmission request) may be grayed out (or made inactive) so that the electronic button will not be selected (or pressed), or a comment indicating that "no transmission request is currently available" may be displayed on the display unit 106. Accordingly, the display control unit 16 may control the content to be displayed on the display unit 106 so that the user will not be able to perform further audio transmission (transmission request).

The determination result acquisition unit 42 of the terminal apparatus 10b receives (or acquires) the determination result obtained by the determination processing unit 23 of the server 20. For example, the determination result acquisition units 42 of the terminal apparatuses 10a to 10f acquire an audio reception permission notification from the server 20.

When the determination result acquisition unit 42 acquires the permission notification, the display control unit 43 of the terminal apparatus 10b causes a message, which indicates that audio reception has been permitted, to be displayed on the display unit 106. When the determination result acquisition unit 42 acquires an audio reception non-permission notification from the server 20, the display control unit 43 causes an error message, which indicates that audio reception has not been permitted, to be displayed on the display unit 106, and modifies the "audio reception" selection screen (checkbox or electronic button) displayed on the display unit 106 so that the selection screen will not be selectable.

The audio receiving unit 44 of the terminal apparatus 10b receives audio data transmitted via the corresponding one of the communication paths described above. The audio output unit 108 converts the received audio data and outputs audio. For example, the audio receiving units 44 of the terminal apparatuses 10b, 10c, 10d, 10e, and 10f receive audio data corresponding to the spoken utterance (or speech) of the user A transmitted from the terminal apparatus 10a via the communication paths (indicated by the single lines in FIG. 11), and the audio output units 108 of the terminal apparatuses 10b, 10c, 10d, 10e, and 10f output audio. Further, the audio receiving units 44 of the terminal apparatuses 10a, 10b, 10c, 10d, and 10e receive audio data corresponding to the spoken utterance (or speech) of the user F transmitted from the terminal apparatus 10f via the communication paths (indicated by the double lines in FIG. 11), and the audio output units 108 of the terminal apparatuses 10a, 10b, 10c, 10d, and 10e output audio. This allows, for example, the users B, C, D, and E of the terminal apparatuses 10b, 10c, 10d, and 10e to listen to the spoken utterance of the user A and the spoken utterance of the user F at the same timing.

Figure 12:
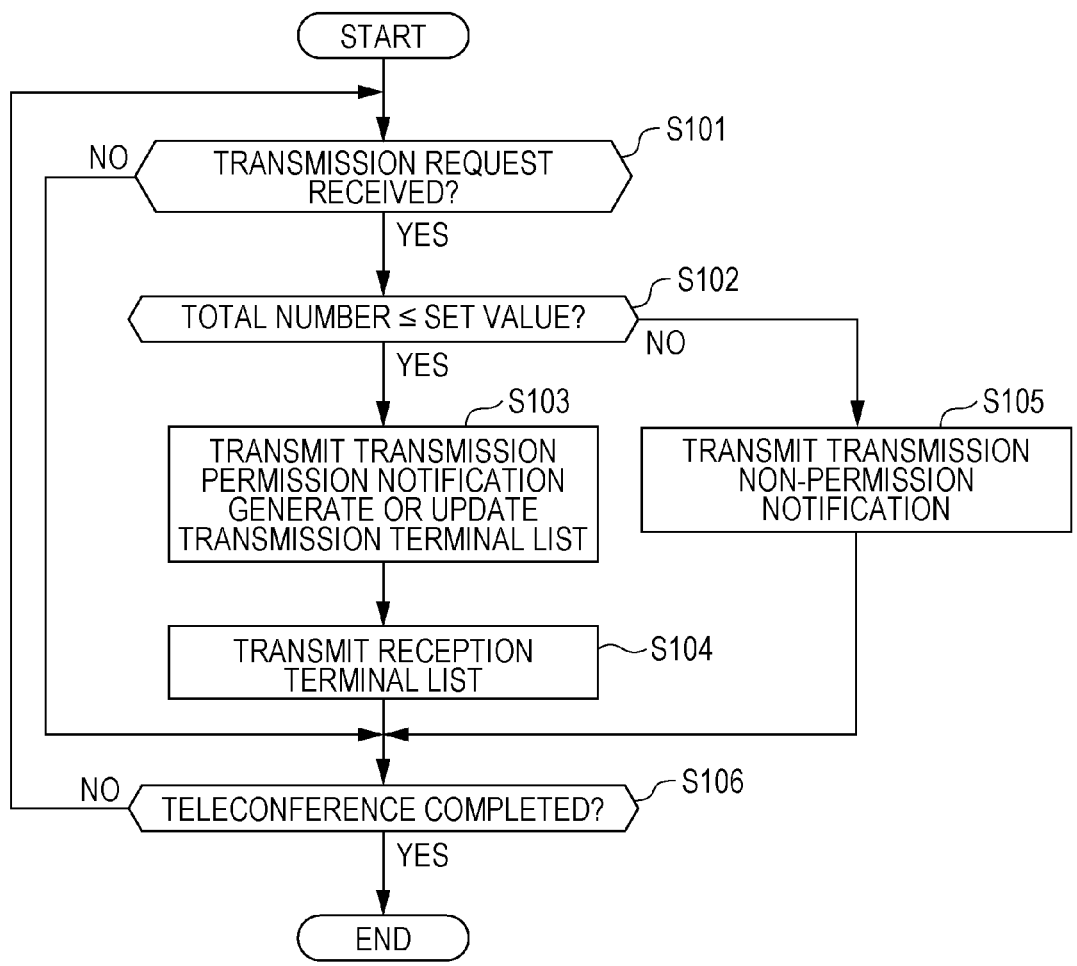
FIG. 12 is an operation flow diagram of the teleconferencing system.

Next, the process flow for the server 20 will be described with reference to a flow diagram. FIG. 12 is a flow diagram of the operation performed when the server 20 receives a transmission request from the terminal apparatus 10.

First, when a transmission request is transmitted from the terminal apparatus 10, the transmission request receiving unit 21 receives the transmission request (S101). Then, the determination processing unit 23 compares the total number of terminal apparatuses 10 that have made a transmission request with a predetermined set value, and determines whether or not the total number is less than or equal to the set value (S102).

If the total number is less than or equal to the set value, the determination processing unit 23 transmits an audio transmission permission notification to the terminal apparatus 10 that has made the transmission request, and the terminal information generation unit 24 generates a transmission terminal list (see FIG. 6) if the transmission terminal list is not present, or updates a transmission terminal list by adding the terminal apparatus 10 that has made the transmission request to the transmission terminal list if the transmission terminal list is already present (S103). Then, the terminal information generation unit 24 lists pieces of information on terminal apparatuses that have made a reception request to generate a reception terminal list, and transmits the reception terminal list to the terminal apparatuses 10 registered in the transmission terminal list (S104).

If it is determined in S102 that the total number is greater than the set value, the determination processing unit 23 transmits an audio transmission non-permission notification to the terminal apparatus 10 that has transmitted the transmission request (S105). The processing of S101 to S105 is repeatedly performed until the end of the teleconference (S106).

Figure 13:
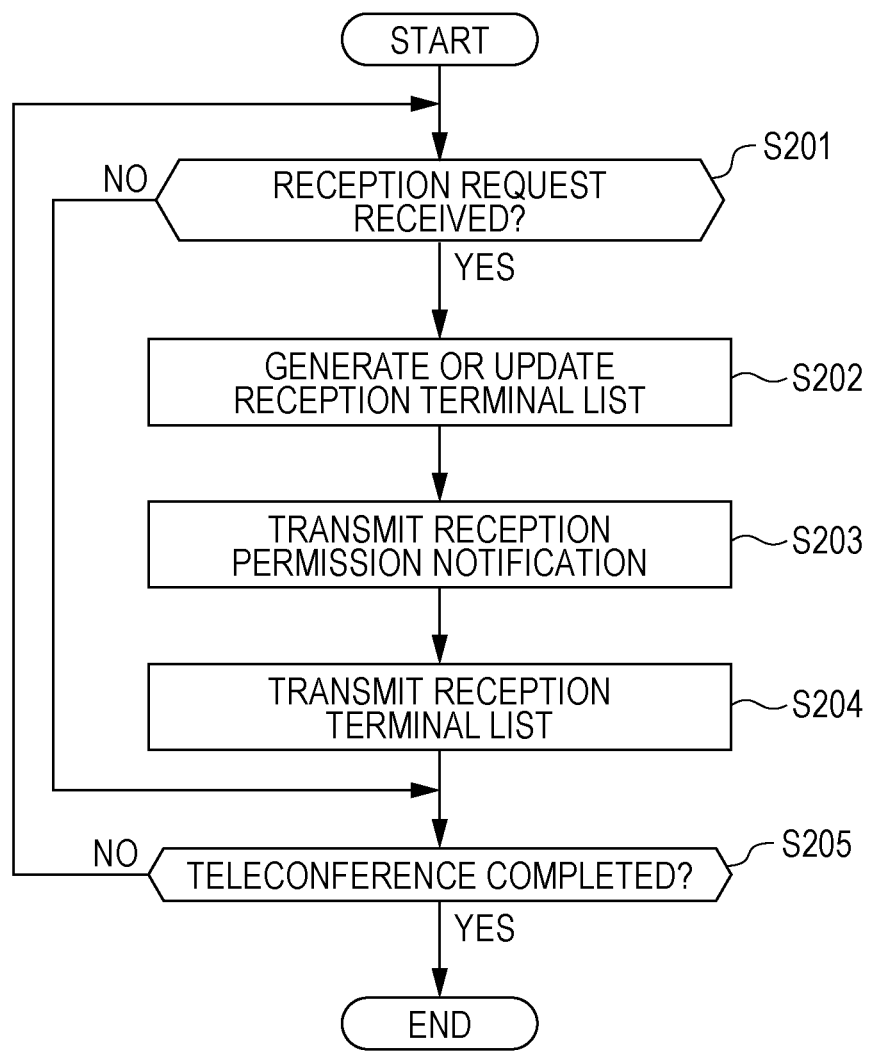
FIG. 13 is an operation flow diagram of the teleconferencing system.

FIG. 13 is a flow diagram of the operation performed when the server 20 receives a reception request from the terminal apparatus 10.

First, when a reception request is transmitted from the terminal apparatus 10, the reception request receiving unit 22 receives the reception request (S201). Then, the terminal information generation unit 24 generates or updates a reception terminal list (see FIG. 7) (S202). Then, the terminal information generation unit 24 transmits an audio reception permission notification to the terminal apparatuses 10 registered in the reception terminal list (S203). By way of example, audio reception is permitted for all the reception requests received by the reception request receiving unit 22. The determination processing unit 23 may permit audio reception only when the total number is less than or equal to a predetermined set value, and may transmit, if audio reception is not permitted, an audio reception non-permission notification to the terminal apparatus 10. Then, the terminal information generation unit 24 acquires a transmission terminal list, and transmits the reception terminal list to each of the terminal apparatuses 10 registered in the transmission terminal list (S204). If the reception terminal list is modified (or updated), only the modified (or added) portion of the reception terminal list may be transmitted. The processing of S201 to S204 is repeatedly performed until the end of the teleconference (S205).

Figure 14:
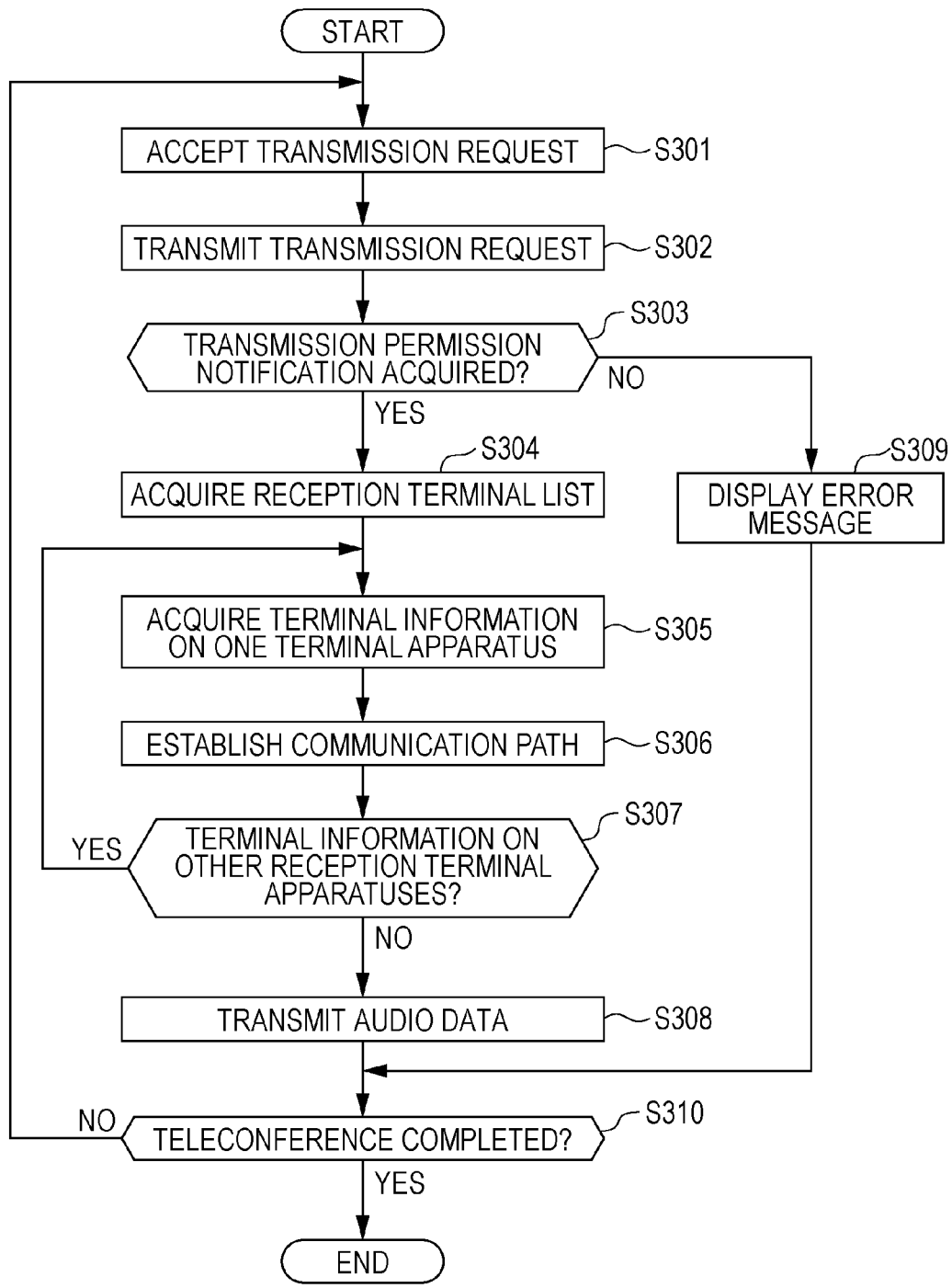
FIG. 14 is an operation flow diagram of the teleconferencing system.

FIG. 14 is a flow diagram of the operation performed when a user makes a transmission request by using the terminal apparatus 10.

First, the terminal apparatus 10 accepts a transmission request from the user during a teleconference (S301). Then, the transmission request transmitting unit 11 transmits the accepted transmission request to the server 20 (S302). Upon receipt of the transmission request, the server 20 executes the processing of S101 to S105 illustrated in FIG. 12.

Then, the determination result acquisition unit 12 of the terminal apparatus 10 acquires a transmission permission notification or a transmission non-permission notification from the server 20 (S303). If a transmission permission notification is acquired, the terminal information acquisition unit 13 acquires a reception terminal list from the server 20 (S304).

Then, the communication path establishment unit 14 acquires terminal information (e.g., the terminal ID) on any one of the terminal apparatuses 10 in the reception terminal list (S305). Then, the communication path establishment unit 14 establishes a communication path with the terminal apparatus 10 corresponding to the acquired terminal information to transmit audio data (S306). The communication path establishment unit 14 establishes communication paths with all the terminal apparatuses 10 registered in the reception terminal list (S307).

Then, the audio transmitting unit 15 transmits audio data to the terminal apparatuses 10 via the established communication paths (S308).

If the determination result acquisition unit 12 acquires a transmission non-permission notification from the server 20 in S303, the display control unit 16 of the terminal apparatus 10 causes an error message to be displayed on the display unit 106 (S309). The processing of S301 to S309 is repeatedly performed until the end of the teleconference (S310).

As described above, the teleconferencing system 100 imposes an upper limit on the number of transmission terminals are allowed to provide speech (or that transmit audio), and dynamically changes the number of terminal apparatuses permitted to perform transmission in accordance with the instructions given by a user, so that a communication path is established between a terminal apparatus permitted to perform transmission and another terminal apparatus.

The teleconferencing system 100 may not necessarily be configured in the manner described above, and may have any configuration. In the following, the configuration of teleconferencing systems 100 according to modifications will be described, focusing on differences from the configuration described above. In the teleconferencing systems 100 according to the following modifications, elements having substantially the same functions as those of the teleconferencing system 100 described above are not described.

Figure 15:
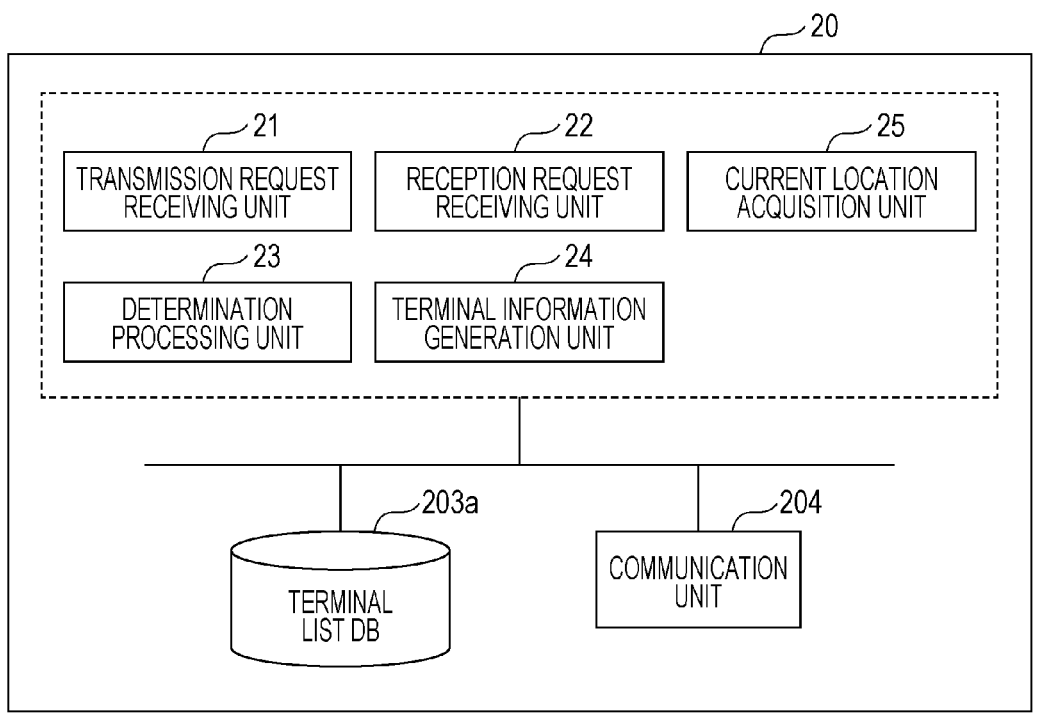
FIG. 15 is a functional block diagram illustrating a specific configuration of a server according to a first modification.

In a teleconferencing system 100 according to a first modification, the server 20 may also include a current location acquisition unit 25 that acquires the current location of each of the terminal apparatuses 10. FIG. 15 is a functional block diagram illustrating a specific configuration of the server 20 according to the first modification.

The current location acquisition unit 25 receives a detection value of a position detector (such as a global positioning system (GPS) detector) (not illustrated) provided in, for example, each of the terminal apparatuses 10 to acquire the current location (such as the address) of the terminal apparatus 10. Alternatively, position information, such as IP addresses and subnets of a network, may be set in advance, and the current location acquisition unit 25 may acquire the IP address of each of the terminal apparatuses 10 to acquire the current location of the terminal apparatus 10.

The determination processing unit 23 determines, in accordance with a reception request received by the reception request receiving unit 22 and the current location of each of the terminal apparatuses 10 acquired from the current location acquisition unit 25, whether or not the terminal apparatus 10 that has transmitted the reception request is permitted to receive audio.

The terminal information generation unit 24 generates reception terminal information in accordance with a reception request received by the reception request receiving unit 22 and the determination result of the determination processing unit 23. Specifically, the terminal information generation unit 24 lists pieces of information on terminal apparatuses 10 permitted by the determination processing unit 23 among the terminal apparatuses 10 that have made a reception request to generate a reception terminal list. The terminal information generation unit 24 transmits the reception terminal list to the terminal apparatuses 10 permitted to transmit audio by the determination processing unit 23.

Figure 16:
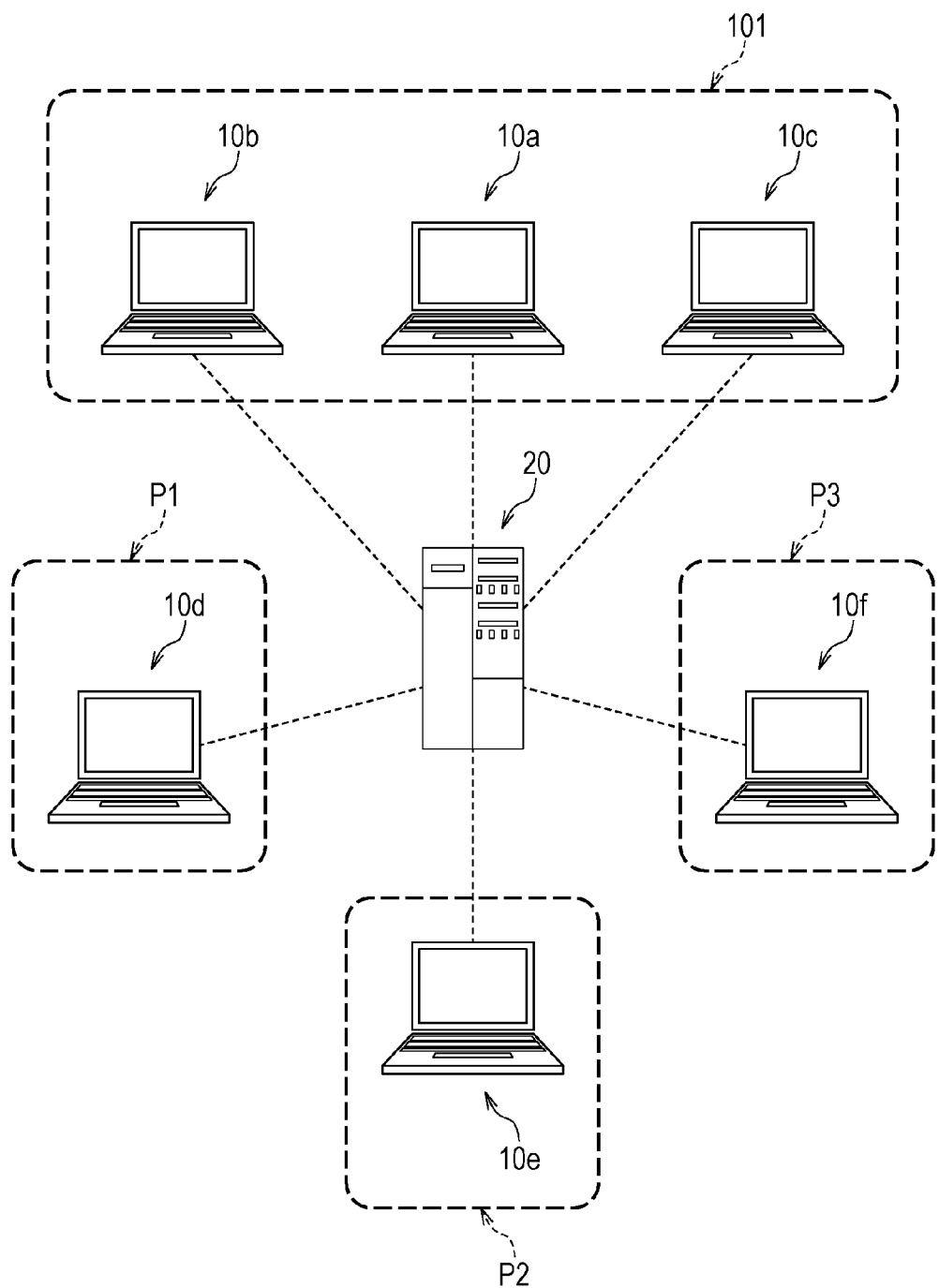
FIG. 16 illustrates an example of a network configuration of a teleconferencing system.

A specific example will be described hereinafter. FIG. 16 illustrates a network configuration in which the terminal apparatuses 10a, 10b, and 10c are located in a conference room 101, the terminal apparatus 10d is located in a place P1 distant from the conference room 101, the terminal apparatus 10e is located in a place P2 distant from the conference room 101, and the terminal apparatus 10f is located in a place P3 distant from the conference room 101.

In the network configuration illustrated in FIG. 16, it is assumed that the terminal apparatuses 10a and 10f have transmitted a transmission request and the terminal apparatuses 10a to 10f have transmitted a reception request. The total number of terminal apparatuses that have made a transmission request is two, and is less than or equal to the set value, which is three. Thus, the terminal apparatuses 10a and 10f are permitted to transmit audio.

The current location acquisition unit 25 acquires current locations of the terminal apparatuses 10a to 10f. That is, the current location acquisition unit 25 acquires the conference room 101 as the current location of the terminal apparatuses 10a, 10b, and 10c, the distant place P1 as the current location of the terminal apparatus 10d, the distant place P2 as the current location of the terminal apparatus 10e, and the distant place P3 as the current location of the terminal apparatus 10f.

The determination processing unit 23 determines whether or not the terminal apparatuses 10 are currently in the same location or are located in a preset area (or in a predetermined place). If the multiple terminal apparatuses 10 are located in the predetermined place, one of the multiple terminal apparatuses 10 is permitted to receive audio, and the other terminal apparatuses 10 are not permitted to receive audio. In the network configuration illustrated in FIG. 16, the terminal apparatus 10a among the terminal apparatuses 10a, 10b, and 10c located in a predetermined place (e.g., the conference room 101) is permitted to receive audio, and the terminal apparatuses 10b and 10c are not permitted to receive audio. The determination processing unit 23 transmits the determination result (a permission notification or a non-permission notification) to each of the terminal apparatuses that have transmitted a reception request.

Figure 18:
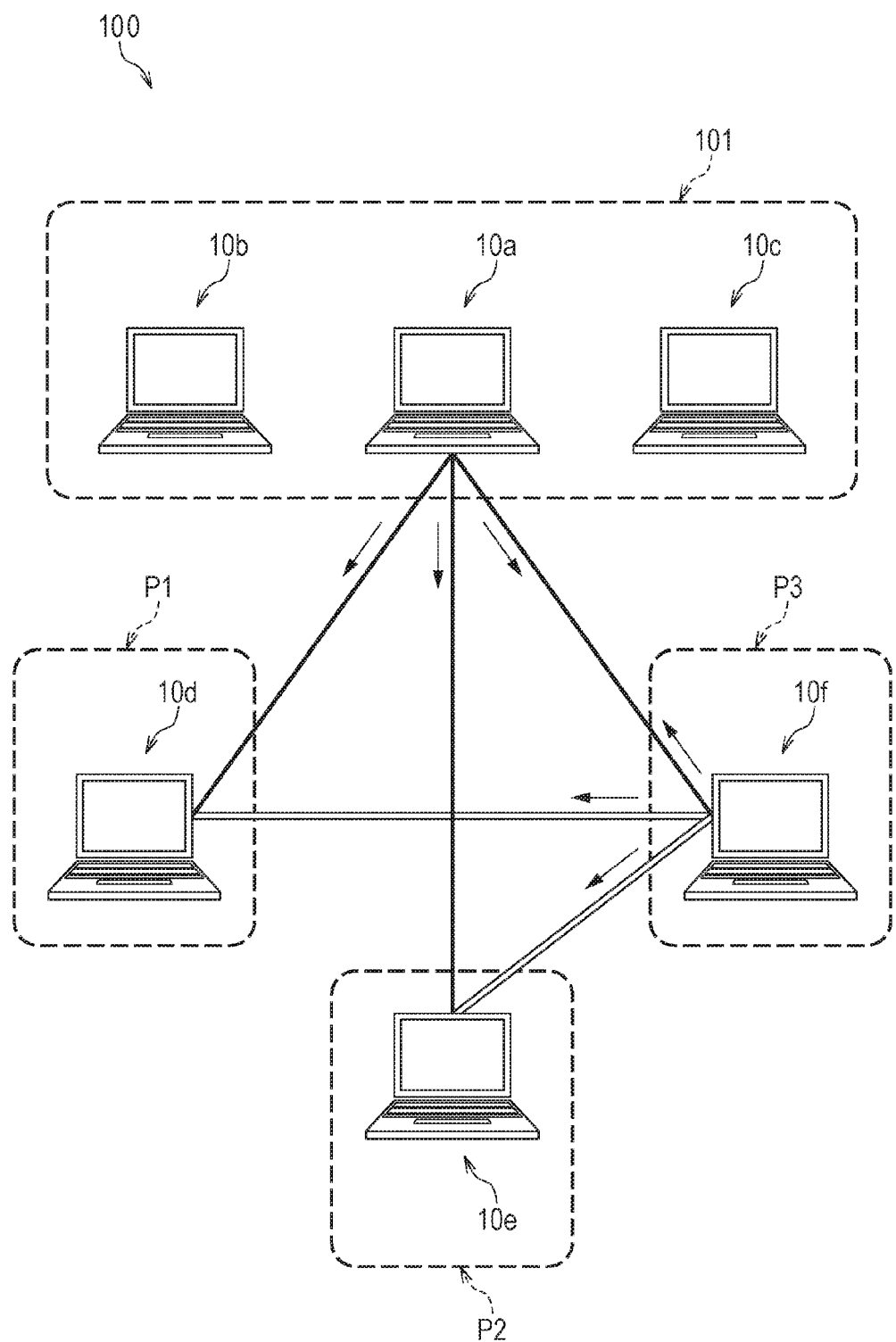
FIG. 18 illustrates an example of a network configuration including communication paths according to the first modification.

The terminal information generation unit 24 generates a reception terminal list illustrated in FIG. 17 in accordance with the determination results, and transmits the reception terminal list to the terminal apparatuses 10a and 10f. The terminal apparatuses 10a and 10f establish a communication path in accordance with the acquired reception terminal list. FIG. 18 illustrates a network configuration including communication paths established by the teleconferencing system 100 according to the first modification.

If the multiple terminal apparatuses 10 are located in a predetermined place and plural terminal apparatuses 10 of them have made a transmission request, the determination processing unit 23 may permit one of the plural terminal apparatuses 10 that have made the transmission request to transmit audio, and may not permit the other terminal apparatuses 10 to transmit audio. For example, if the terminal apparatuses 10a, 10b, and 10c located in the conference room 101 have made a transmission request, the terminal apparatus 10a is permitted to transmit audio, and the terminal apparatuses 10b and 10c are not permitted to transmit audio. The terminal information generation unit 24 transmits a reception terminal list to the terminal apparatus 10a permitted to transmit audio, and the terminal apparatus 10a establishes a communication path in accordance with the acquired reception terminal list.

In a teleconference having the network configuration described above, multiple users (for example, the users B and C) of the multiple terminal apparatuses 10 located in the same conference room are able to directly listen to the content of the speech of one user in the same conference (for example, the user A), and are also able to listen to the speech of other users in distant places (for example, the users D, E, and F) through any of the multiple terminal apparatuses 10 (for example, the terminal apparatus 10a) which has received and output the speech of the other users.

In a teleconferencing system 100 according to a second modification, the set value described above may be dynamically changed. Specifically, the set value may be set in accordance with the number of terminal apparatuses 10 connected via the communication network 30. For example, the set value may be reduced in accordance with an increase in the number of terminal apparatuses 10. This configuration is suitable for use in teleconferences in which speakers (or presenters) are determined, such as in a seminar. The set value may also be calculated and set according to the total number of terminal apparatuses 10 connected via a network. The set value may also be set in accordance with the number of terminal apparatuses 10 that have made a reception request.

In a teleconferencing system 100 according to a third modification, when the period of time during which no audio data is transmitted from a terminal apparatus 10 permitted to transmit audio after a communication path was established has reached a predetermined value, the communication path establishment unit 14 may cancel the communication path with the terminal apparatus 10. For example, if the user A for whom audio transmission is permitted does not speak for a certain period of time, the communication path establishment unit 14 forcibly cancels the communication path established with the terminal apparatus 10a of the user A. In the configuration described above, furthermore, an image of a user who uses a transmission terminal apparatus may be captured using a camera, and the captured image may be analyzed to determine whether or not the user has made an utterance and determine the period of time during which the user is silent. The camera may be mounted in the terminal apparatus 10, or may be placed outside the terminal apparatus 10 (for example, placed in a conference room).

In the exemplary embodiment described above, as illustrated in FIG. 14, if a transmission non-permission notification is acquired, the display control unit 16 of the terminal apparatus 10 causes an error message to be displayed on the display unit 106. However, the configuration for non-permission of audio transmission is not limited to that described above.

For example, in a teleconferencing system 100 according to a fourth modification, control may be performed so that, if the total number of transmission terminal apparatuses has reached the set value at the time when the terminal apparatus 10 is connected to the server 20, the user will not be allowed to check the checkbox. Furthermore, information may be acquired from the server 20 in accordance with a change in the total number of transmission terminal apparatuses, and the checkbox may be controlled. The total number of transmission terminal apparatuses may be obtained by polling to the server 20, or, desirably, each terminal apparatus may obtain the total number of transmission terminal apparatuses from the server 20 while connected via Web Socket or the like.

The teleconferencing system 100 may have the following configurations.

In the teleconferencing system 100, even if a large number of terminal apparatuses are connected, a limited number of persons (i.e., speaker terminals) who speak simultaneously will exist at the moment. Thus, the number of persons who are allowed to speak simultaneously (i.e., the number of transmission terminal apparatuses) is limited, and the established status of a communication path is dynamically changed while the transmission terminal apparatuses are switched. This may enable audio data to be mutually transmitted and received among a large number of terminal apparatuses in a pseudo-manner.

In the teleconferencing system 100, furthermore, each terminal apparatus is allowed to select audio transmission/audio reception, and the server 20 is notified of the transition of the audio transmission/audio reception state of each terminal apparatus.

Furthermore, the server 20 notifies a terminal apparatus for which audio transmission has been selected of a list of terminal apparatuses for which audio reception has been selected. In this case, the terminal apparatus may not be notified of information on a terminal apparatus in which no state transition has occurred. Upon receipt of the notification, the transmission terminal apparatus makes a call (or initiates a connection request) to only a newly registered reception terminal apparatus to request the reception terminal apparatus to receive its stream information.

In the teleconferencing system 100, furthermore, the server 20 manages the total number of terminal apparatuses permitted to simultaneously perform transmission, and, if the total number has reached the upper limit value (i.e., the set value), a terminal apparatus is not allowed to select a transmission request.

In the teleconferencing system 100, furthermore, transmission terminal apparatuses may include two types of terminal apparatuses, namely, a constant transmission terminal apparatus and a temporary transmission terminal apparatus, and the temporary transmission terminal apparatus may be permitted to perform transmission only for a certain period of time. After the certain period of time has elapsed, audio transmission may be canceled (or the transmission request checkbox may be unchecked). The temporary transmission terminal apparatus may also be permitted to perform transmission only for a period during which a user presses the audio transmission button. In the temporary transmission terminal apparatus, the transmission request may be canceled if the user is silent for a certain period of time.

In the teleconferencing system 100, furthermore, a user who wishes to speak may make a transmission request using a terminal apparatus, and a user designated by a specific terminal apparatus ("master terminal") may be allowed to speak (or the terminal apparatus of the user may be permitted to serve as a transmission terminal apparatus).

Figure 19:
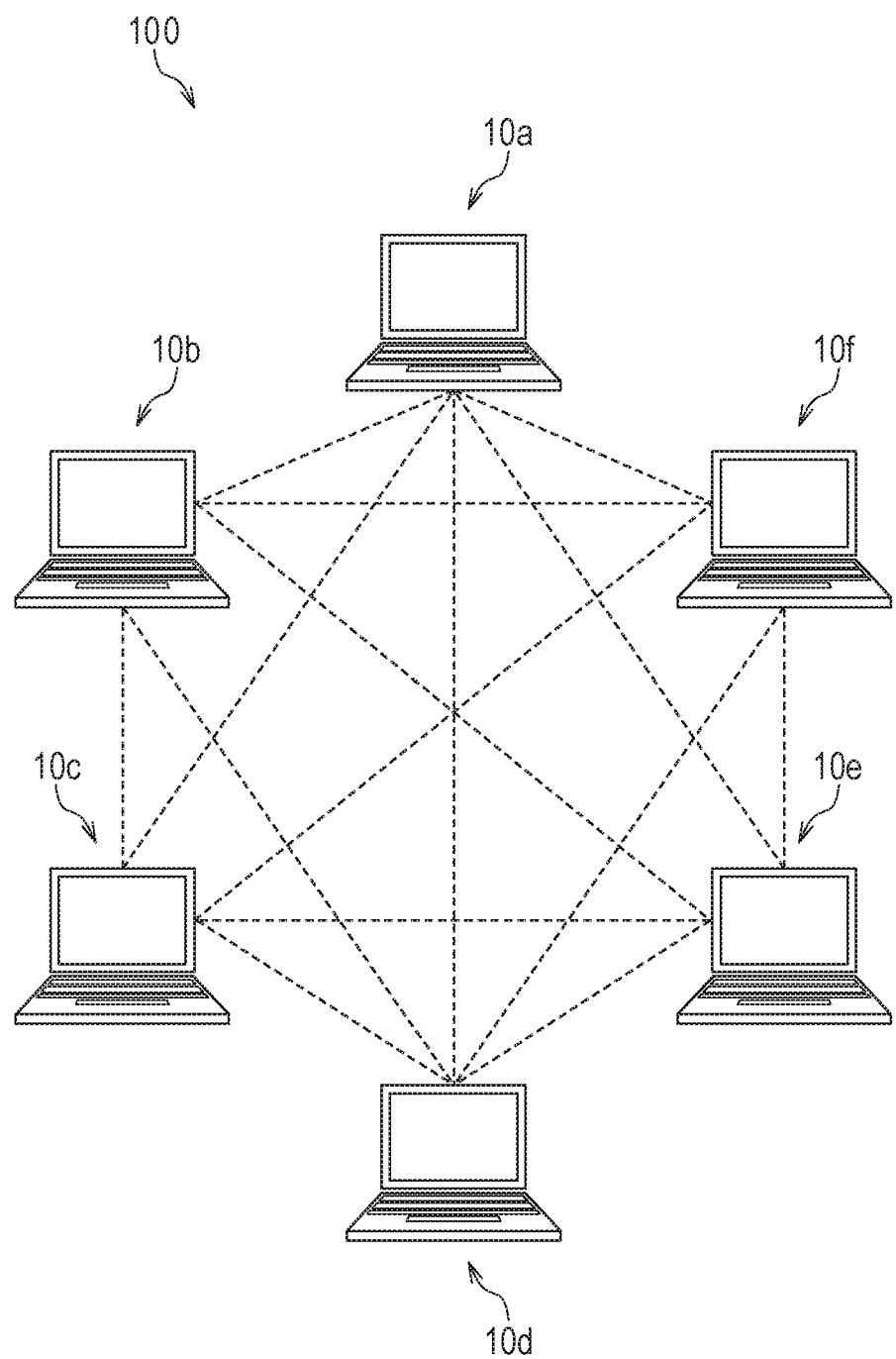
FIG. 19 illustrates an example of a network configuration of the teleconferencing system.

The network configuration of the teleconferencing system 100 is not limited to the configuration illustrated in FIG. 5, and the server 20 may be the same as one of the multiple terminal apparatuses 10, or the server 20 may not necessarily be used (FIG. 19). A configuration illustrated in FIG. 19 is implemented by a program corresponding to each element included in the teleconferencing system 100, which is downloaded to each of the terminal apparatuses 10a to 10f. Specifically, the terminal apparatuses 10a to 10f commonly include the elements illustrated in FIG. 3 and FIG. 4, and the CPU of each terminal apparatus executes a program stored in the memory of each terminal apparatus to implement the teleconferencing system 100. In a configuration that does not include the server 20, when one of the terminal apparatuses 10 makes a transmission request (for audio transmission), the transmission request may be transmitted to all the terminal apparatuses 10 so that all the terminal apparatuses 10 may share the terminal list DB 203a. In the configuration described above, one of the terminal apparatuses 10 that has made a transmission request may perform a process to determine whether or not to permit audio transmission before the transmission request is transmitted to the other terminal apparatuses 10. If it is determined that audio transmission is permitted, the transmission request may be transmitted to the other terminal apparatuses 10. The program to be downloaded may be created by, for example, JAVASCRIPT (registered trademark). Accordingly, each terminal apparatus may function as a transmission terminal apparatus or a reception terminal apparatus in accordance with the state of the conference. The terminal apparatus 10 to or on which the program described above has been downloaded or recorded functions as an information processing apparatus. The computer to which the program has been downloaded may be either the terminal apparatus 10 or the server 20.

The configuration illustrated in FIG. 5 may be implemented by a program corresponding to each element included in the teleconferencing system 100, which is downloaded to the server 20. The server 20 to or on which the program described above has been downloaded or recorded functions as an information processing apparatus.

The teleconferencing system 100 is not limited to a system for transmission and reception of audio data. That is, the teleconferencing system 100 may be applied to transmission and reception of media data including at least one of audio data and video data (or moving image data). The teleconferencing system 100 may also be applied to various teleconferences such as a video conference and a telephone conference. In a video conference, video captured using a camera mounted in each terminal apparatus is provided via two-way communication between terminal apparatuses via the communication paths described above. The teleconferencing system 100 may also be applied to a remote conference in which participants are in distant locations.

While a teleconferencing system has been discussed as an example of an information processing system, the information processing system is not limited to a teleconferencing system, and may include diverse systems that allow media data to be shared between network-connected terminal apparatuses.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for transmission and reception of media data including at least one of audio data and video data among a plurality of terminal apparatuses connected via a network, the process comprising:

receiving a transmission request for the media data from at least one terminal apparatus among the plurality of terminal apparatuses;

receiving a reception request for the media data from at least one terminal apparatus among the plurality of terminal apparatuses; and establishing a communication path to transmit the media data between a terminal apparatus that has made the transmission request among the plurality of terminal apparatuses and at least one of terminal apparatuses that have made the reception request among the plurality of terminal apparatuses, in a case where the total number of terminal apparatuses that have made the transmission request is less than or equal to a predetermined set value, wherein the communication path is prevented from being established in response to the total number of terminal apparatuses that have made the transmission request being greater than the predetermined set value, and the communication path is prevented from being established in response to the total number of terminal apparatuses that have made the reception request being greater than the predetermined set value, non-permission of communication path establishment being changed to permission of communication path establishment in response to cancellation of media data transmission by one of the terminal apparatuses resulting in the total number of terminal apparatuses that have made the transmission request being equal to or less than the predetermined set value, and non-permission of communication path establishment being changed to permission of communication path establishment in response to cancellation of media data reception by one of the terminal apparatuses resulting in the total number of terminal apparatuses that have made the reception request being equal to or less than the predetermined set value.

2. The non-transitory computer readable medium according to claim 1, wherein
the process further comprises acquiring a current location of each of the plurality of terminal apparatuses, and
in a case where the terminal apparatuses that have made the reception request are located within a predetermined range, the establishing establishes the communication path with one of the terminal apparatuses.

3. The non-transitory computer readable medium according to claim 1, wherein
the set value is set in accordance with the number of terminal apparatuses connected via the network.

4. The non-transitory computer readable medium according to claim 1, wherein
the set value is set in accordance with the number of terminal apparatuses that have made the reception request.

5. The non-transitory computer readable medium according to claim 1, wherein
in a case where the total number of terminal apparatuses that have made the transmission request has reached the set value, in response to receipt of a new transmission request from a terminal apparatus among the plurality of terminal apparatuses, the establishing includes denying establishment of a communication path with the terminal apparatus that has made the new transmission request for the media data.

6. The non-transitory computer readable medium according to claim 1, wherein
in a case where a period of time during which the terminal apparatus that has made the transmission request does not transmit the media data after the communication path was established has reached a predetermined value, the establishing includes canceling the established communication path.

7. The non-transitory computer readable medium according to claim 1, wherein
the process further comprises controlling content to be displayed on a display of each of the plurality of terminal apparatuses, and
in a case where the total number of terminal apparatuses that have made the transmission request has reached the set value, the controlling causes a rejection screen to be displayed on the display of a terminal apparatus that has made a new transmission request among the plurality of terminal apparatuses, the rejection screen being a screen indicating that the new transmission request will not be accepted.

8. The non-transitory computer readable medium according to claim 1, wherein
the process further comprises controlling content to be displayed on a display of each of the plurality of terminal apparatuses, and
in a case where the total number of terminal apparatuses that have made the transmission request has reached the set value, the controlling controls the content to be displayed on the display so as to prevent a user from selecting a new transmission request.

9. The non-transitory computer readable medium according to claim 1, wherein
the process further comprises controlling content to be displayed on a display of each of the plurality of terminal apparatuses, and
in a case where the total number of terminal apparatuses that have made the transmission request has reached the set value, when a terminal apparatus among the plurality of terminal apparatuses accesses a server that manages all the plurality of terminal apparatuses, the controlling content includes performing control so as to prevent a user from checking a checkbox displayed on the display of the terminal apparatus to make a transmission request for the media data.

10. The non-transitory computer readable medium according to claim 1, wherein
the process further comprises controlling content to be displayed on a display of each of the plurality of terminal apparatuses,
in a case where the total number of terminal apparatuses that have made the transmission request has reached the set value, the controlling controls the content to be displayed on the display so as to prevent a user from selecting a new transmission request for the media data, and
in a case where the total number of terminal apparatuses that have made the transmission request has fallen below the set value, the controlling changes the content to be displayed on the display so as to allow a user to select a new transmission request for the media data.

11. A non-transitory computer readable medium storing a program causing a computer to execute a process for transmission and reception of media data including at least one of audio data and video data among a plurality of terminal apparatuses connected via a network, the process comprising:
transmitting a transmission request from a terminal apparatus among the plurality of terminal apparatuses to transmit the media data to another terminal apparatus; and
establishing a communication path to transmit the media data between a terminal apparatus that has made the transmission request among the plurality of terminal apparatuses and at least one of a plurality of terminal apparatuses that have made a reception request to receive the media data, in a case where the total number of terminal apparatuses that have made the transmission request is less than or equal to a predetermined set value, wherein the communication path is prevented from being established in response to the total number of terminal apparatuses that have made the transmission request being greater than the predetermined set value, and the communication path is prevented from being established in response to the total number of terminal apparatuses that have made the reception request being greater than the predetermined set value,
non-permission of communication path establishment being changed to permission of communication path establishment in response to cancellation of media data transmission by one of the terminal apparatuses resulting in the total number of terminal apparatuses that have made the transmission request being equal to or less than the predetermined set value, and non-permission of communication path establishment being changed to permission of communication path establishment in response to cancellation of media data reception by one of the terminal apparatuses resulting in the total number of terminal apparatuses that have made the reception request being equal to or less than the predetermined set value.

12. An information processing apparatus for transmission and reception of media data including at least one of audio data and video data among a plurality of terminal apparatuses connected via a network, the information processing apparatus comprising:

a transmission request transmitting unit that transmits a transmission request from a terminal apparatus among the plurality of terminal apparatuses to transmit the media data to another terminal apparatus; and a communication path establishment unit that establishes a communication path to transmit the media data between a terminal apparatus that has made the transmission request among the plurality of terminal apparatuses and at least one of a plurality of terminal apparatuses that have made a reception request to receive the media data, in a case where the total number of terminal apparatuses that have made the transmission request is less than or equal to a predetermined set value, wherein the communication path is prevented from being established in response to the total number of terminal apparatuses that have made the transmission request being greater than the predetermined set value, and the communication path is prevented from being established in response to the total number of terminal apparatuses that have made the reception request being greater than the predetermined set value, non-permission of communication path establishment being changed to permission of communication path establishment in response to cancellation of media data transmission by one of the terminal apparatuses resulting in the total number of terminal apparatuses that have, made the transmission request being equal to or less than the predetermined set value, and non-permission of communication path establishment being changed to permission of communication path establishment in response to cancellation of media data reception by one of the terminal apparatuses resulting in the total number of terminal apparatuses that have made the reception request being equal to or less than the predetermined set value.

13. An information processing system for transmission and reception of media data including at least one of audio data and video data among a plurality of terminal apparatuses connected via a network, the information processing system comprising:

a transmission request receiving unit that receives a transmission request for the media data from at least one terminal apparatus among the plurality of terminal apparatuses;

a reception request receiving unit that receives a reception request for the media data from at least one terminal apparatus among the plurality of terminal apparatuses; and a communication path establishment unit that establishes a communication path to transmit the media data between a terminal apparatus that has made the transmission request among the plurality of terminal apparatuses and at least one of terminal apparatuses that have made the reception request among the plurality of terminal apparatuses, in a case where the total number of terminal apparatuses that have made the transmission request is less than or equal to a predetermined set value, wherein the communication path is prevented from being established in response to the total number of terminal apparatuses that have made the transmission request being greater than the predetermined set value, and the communication path is prevented from being established in response to the total number of terminal apparatuses that have made the reception request being greater than the predetermined set value, non-permission of communication path establishment being changed to permission of communication path establishment in response to cancellation of media data transmission by one of the terminal apparatuses resulting in the total number of terminal apparatuses that have made the transmission request being equal to or less than the predetermined set value, and non-permission of communication path establishment being changed to permission of communication path establishment in response to cancellation of media data reception by one of the terminal apparatuses resulting in the total number of terminal apparatuses that have made the reception request being equal to or less than the predetermined set value.

* * * * *